US012752220B2

(12) United States Patent
Wei et al.

(10) Patent No.: US 12,752,220 B2
(45) Date of Patent: Oct. 6, 2026

(54) COLUMN COMPRISING PARTICLES

(71) Applicant: AGILENT TECHNOLOGIES, INC., Santa Clara, CA (US)

(72) Inventors: Ta-Chen Wei, Hockessin, DE (US); Andrei Bordunov, Santa Clara, CA (US); Charu Kumar, Sunnyvale, CA (US); Ace Gita Galermo, Gilroy, CA (US); John Davies, Santa Clara, CA (US); Andrew Coffey, Shrewsbury (GB)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 438 days.

(21) Appl. No.: 18/362,691

(22) Filed: Jul. 31, 2023

(65) Prior Publication Data

US 2025/0041760 A1 Feb. 6, 2025

(51) Int. Cl.

| | |
|---|---|
| ***B01D 15/20*** | (2006.01) |
| ***B01D 15/34*** | (2006.01) |
| ***B01J 20/28*** | (2006.01) |
| ***B01J 20/283*** | (2006.01) |
| ***G01N 30/52*** | (2006.01) |

(52) U.S. Cl.

CPC ........... *B01D 15/206* (2013.01); *B01D 15/34* (2013.01); *B01J 20/28004* (2013.01); *B01J 20/28071* (2013.01); *B01J 20/28073* (2013.01); *B01J 20/28076* (2013.01); *B01J 20/28083* (2013.01); *B01J 20/28085* (2013.01); *B01J 20/283* (2013.01)

(58) Field of Classification Search

CPC ...... B01D 15/34; C07K 16/065; C07K 16/08; A61K 47/42; B01J 20/28004

See application file for complete search history.

(56) References Cited

U.S. PATENT DOCUMENTS

| | | | |
|---|---|---|---|
| 2013/0280788 A1 | 10/2013 | Skudas | |
| 2019/0111419 A1 | 4/2019 | Maloisel et al. | |
| 2019/0358562 A1 | 11/2019 | Gjerde | |
| 2022/0081468 A1 | 3/2022 | Schmudlach et al. | |

FOREIGN PATENT DOCUMENTS

WO 2023104770 A1 6/2023

OTHER PUBLICATIONS

Written Opinion of PCT Application No. PCT/US2024/039347 mailed Nov. 19, 2024.

*Primary Examiner* — Barry A Chestnut

(74) *Attorney, Agent, or Firm* — Lando & Anastasi, LLP

(57) ABSTRACT

A column including particles having an average particle size ranging from about 1 μm to about 5 μm; the particles have an average pore size ranging from about 450 Å to about 3000 Å; and the particles have an average pore volume ranging from about 0.1 $cm^3/g$ to about 5 $cm^3/g$ is disclosed. The column can be a size exclusion chromatography column. The column can be used in a method to separate monomers from viral analytes, which is also disclosed.

20 Claims, 11 Drawing Sheets

COLUMN COMPRISING PARTICLES

FIELD OF THE INVENTION

The present disclosure generally relates to a column comprising particles having an average particle size ranging from about 1 μm to about 5 μm; the particles have an average pore size ranging from about 450 Å to about 3000 Å; and the particles have an average pore volume ranging from about 0.1 $cm^3/g$ to about 5 $cm^3/g$. The column can be a size exclusion chromatography column. The column can be used in a method to separate monomers from viral analytes.

BACKGROUND OF THE INVENTION

Size Exclusion Chromatography (SEC) column is a powerful analytical tool that separates molecules based on their hydrodynamic size, and it is commonly used in the purification and characterization of biomolecules. However, there is no one-size-fits-all SEC column for the separation of various biological analytes. The resolution will depend on several factors, including the size range of analytes being analyzed and the pore structure of the packing materials. The inert surface chemistry is also important to prevent non-specific interactions with the analytes.

What is needed is a size exclusion chromatography column that can deliver high throughput and high resolution for viral analyte, such as adeno-associated viruses (AAVs), aggregate analysis.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1A:
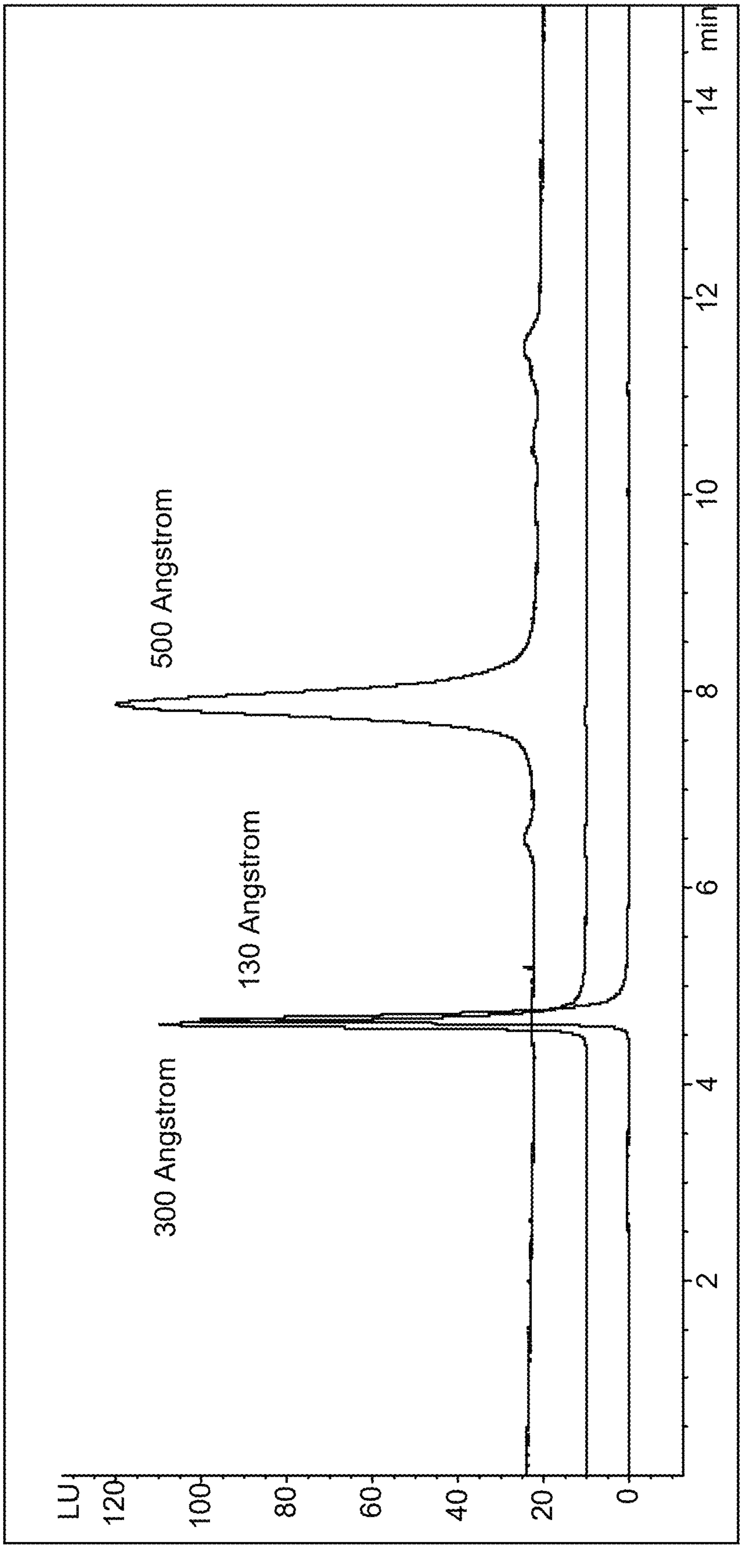
FIG. 1A is a chromatogram illustrating the effects of comparative and inventive pore size on separation of monomers and dimers from viral analytes.

In an aspect, there is disclosed a column comprising particles having an average particle size ranging from about 1 μm to about 5 μm; the particles have an average pore size ranging from about 450 Å to about 3000 Å; and the particles have an average pore volume ranging from about 0.1 $cm^3/g$ to about 5 $cm^3/g$.

In another aspect, there is disclosed a method of using the disclosed column, comprising injecting a viral analyte into a column comprising particles having an average particle size ranging from about 1 μm to about 5 μm; the particles have an average pore size ranging from about 450 Å to about 3000 Å; and the particles have an average pore volume ranging from about 0.1 $cm^3/g$ to about 5 $cm^3/g$; and adjusting a flow rate.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

In its broad and varied embodiments, disclosed herein is a column, such as a size exclusion chromatography column, that can deliver high throughput and high resolution for viral analytes, such as adeno-associated viruses (AAVs), aggregate analysis. An end user can obtain information about the quality and purity of viral analytes more efficiently.

The present disclosure describes a column, comprising particles, such as a plurality of particles, the particles having an average particle size ranging from about 1 μm to about 5 μm; the particles having an average pore size ranging from about 450 Å to about 3000 Å; and the particles have an average pore volume ranging from about 1.0 to about 1.4. The column, such as a size exclusion chromatography column, can provide a resolution of 2.4 between AAV monomers and dimers within a short period of time, for example, about 5 minutes. The particles can be a plurality of particles. For ease of understanding, the use of the "particles" will refer to a plurality of particles, and descriptions of the particles will refer to an average of the plurality of particles. For example, a particle size would be an average particle size for the plurality of particles that can be present in the column.

The particles for use in the column can have any desired shape, which will generally depend on the targeted application. For chromatographic applications, suitable shapes include without limitation spheres, rings, polyhedra, saddles, platelets, fibers, hollow tubes, rods and cylinders, and mixtures of any two or more such shapes. In one aspect, the particles can be substantially spherical. Spherical cores can be easily packed and are thus desirable for certain applications, such as chromatography.

The composition of the particles is not critical. Suitable materials include without limitation glasses, sands, metals, metal oxides, metalloids, ceramics, and combinations thereof. In one aspect, the particles can comprise a metal oxide, such as a refractory metal oxide. In a further aspect, the particles can be a porous metal oxide particle. Exemplary metal oxides include without limitation silica, alumina, titania, zirconia, ferric oxide, antimony oxide, zinc oxide, and tin oxide. In another aspect, the particles can comprise silica, alumina, titania, zirconia, or a combination thereof. In a further aspect, the particles can comprise silica. In one aspect, the metal oxide particle can include surface hydroxyl groups can be modified with a surface modifier.

The particles have an average particle size from about 0.1 μm to about 100 μm, including without limitation particles having an average particle size from about 0.5, 2, 4, 6, 8, 10, 12, 14, 16, 18, 20, 30, 40, 50, 60, 70, 80, and 90 μm. In specific aspects, a particle (e.g. silica) can have an average particle size of from about 1 μm to about 5 μm, including without limitation about 1, 1.2, 1.5, 1.8, 1.9, 2, 2.2, 2.5, 2.7, 3, 3.2, 3.3, 3.5, 3.6, 3.7, 3.8, 4, 4.2, 4.4, 4.6, 4.8, and 5 μm. Particle size can be determined using methods known in the art, for example through the use of a Coulter Counter, which can also count particles and thus provide particle size distributions.

The particle size distribution of the particles can vary depending on the composition of the particle and the method in which the particle was made and/or processed. In one aspect, the particles can have a particle size distribution of less than about 20% of the average particle size, including for example, less than about 15%, less than about 10%, or less than about 5% of the average particle size. In a further aspect, the particles have a particle size distribution of from about 0.5% to about 10% of the average particle size, including without limitation particle size distributions of from about 0.5% to about 8%, 0.5% to about 6%, and from about 0.5% to about 5% of the median particle size.

The average pore size of the particles can affect the separation of viral analytes. Viral analytes are typically large biomolecules, and their size varies depending on the type of virus. Therefore, selecting an appropriate average pore size for the particles used in the column is needed for effective separation of the viral analytes. In particular, if the average pore size is too small, for example, less than about 475 Å, the viral analytes may not be able to enter the pores present on the particle, leading to poor separation of monomer and dimers/aggregates. On the other hand, if the average pore size is too large, for example, greater than about 3000 Å the separation may not be optimal as all analytes (e.g., monomer and dimers/aggregates) could diffuse through the column at the same rate.

The particles can have substantially ordered pores with an average pore size ranging from about 450 Å to about 3000 Å, including for example about 475, 500, 600, 700, 800, 1000, 1200, 1250, or 300 Å average pore sizes. In an aspect, the particles can have substantially ordered pores with an average pore size from about ranging from about 475 Å to about 2000 Å, including for example, about 500 Å to about 1250 Å. The particles can have an average pore size of about 500 Å. The particles can have an average pore size of about 1000 Å.

The pore volume of the particle plays a role in the separation resolution of viral analytes. Bigger pore volumes can result in wider separation windows, which can help in achieving better resolution of various-sized viral analytes. Pore volume can be important when dealing with multiple aggregates of viral analytes or when separating particles with similar sizes. The particles can have an average pore volume of from about 0.1 $cm^3/g$ to about 5 $cm^3/g$, such as from about 0.1 $cm^3/g$ to about 3 $cm^3/g$, and as a further example from about, 0.75 $cm^3/g$ to about 2 $cm^3/g$, and as a further example, from about 1 $cm^3/g$ to about 1.5 $cm^3/g$. In an aspect, the particles can have an average pore volume of from about 1.1 $cm^3/g$ to about 1.4 $cm^3/g$.

The particle average pore size and average pore volume can vary depending on the viral analyte. In an aspect, the particles have an average pore size ranging from about 450 Å to about 3000 Å; and the particles have an average pore volume ranging from about 0.1 $cm^3/g$ to about 5 $cm^3/g$. In another aspect, the particles have an average pore size ranging from about 475 Å to about 2000 Å; and an average pore volume ranging from about 0.1 $cm^3/g$ to about 3 $cm^3/g$. In a further aspect, wherein the particles have an average pore size ranging from about 500 Å to about 1250 Å; and an average pore volume ranging from about 1 $cm^3/g$ to about 1.5 $cm^3/g$. It should be appreciated that any range or specific point for the average pore size disclosed herein can be combined with any range or specific point for the average pore volume disclosed herein. However, some combinations can have enable better resolution of the monomers and aggregates of the viral analytes, as discussed further herein.

When separating viral vectors using chromatography columns, high throughput can play a role when dealing with numerous samples or when time-sensitive results are needed. High throughput can enable an end user to analyze more samples within a given timeframe, which can boost overall productivity. It can reduce time and cost involved in sample analysis and purification thereby making the process of using the chromatography column more efficient and cost-effective. High throughput chromatography columns can minimize a risk of sample degradation or contamination during prolonged analysis or purification processes, which can improve the accuracy and reproducibility of the results.

There is also disclosed herein a method of using the disclosed column, comprising injecting a viral analyte into a column comprising particles having an average particle size ranging from about 1 μm to about 5 μm; the particles have an average pore size ranging from about 450 Å to about 3000 Å; and the particles have an average pore volume ranging from about 0.1 $cm^3/g$ to about 5 $cm^3/g$; and adjusting a flow rate so that monomers separate.

The viral analyte can have an average diameter from about 10 nm to about 55 nm, and for example from about 15 nm to about 40 nm, and as another example from about 20 nm to about 30 nm. In another aspect, the viral analyte can have an average diameter from about 55 nm to about 1000 nm, for example, from about 60 nm to about 100 nm.

EXAMPLES

Experiments were performed using three different pore sizes of monodispersed 3 μm SEC silica particles. The three different pore sizes were 130 Å, 300 Å, and 500 Å. Each of these particles were packed into 4.6×300 mm columns for SEC-FLD (fluorescence detector) evaluation. Additional experiments were performed using particles with a pore size of 500 Å, but with two different pore volumes, e.g., 0.75 and 1.10. The testing condition included a column compartment temperature of 25° C., 50 mM sodium phosphate pH 7.2 and 400 mM NaCl as the mobile phase, flow rate of 0.35 ml/min, and FLD: Ex 280 nm; Em 348 nm. The test samples were viral analytes, such as adeno-associated viruses (AAVs), ranging in size from approximately 20 to 25 nm in diameter for their monomers. In some aspect, the viral analytes ranged in size from 50 to 75 nm, such as 60 nm, in diameter for their monomers.

Example 1A-Pore Size Effect

As seen in FIG. 1A, AAV monomers and dimers were unable to diffuse through SEC columns comprising particles with an average particle size of about 2.7 μm, and having average pore sizes of 130 Å or 300 Å, causing them to be excluded and coeluted. However, when entering a 500 Å particle pore size, AAV monomers and dimers diffused in and out, resulting in clear separation.

Figure 1B:
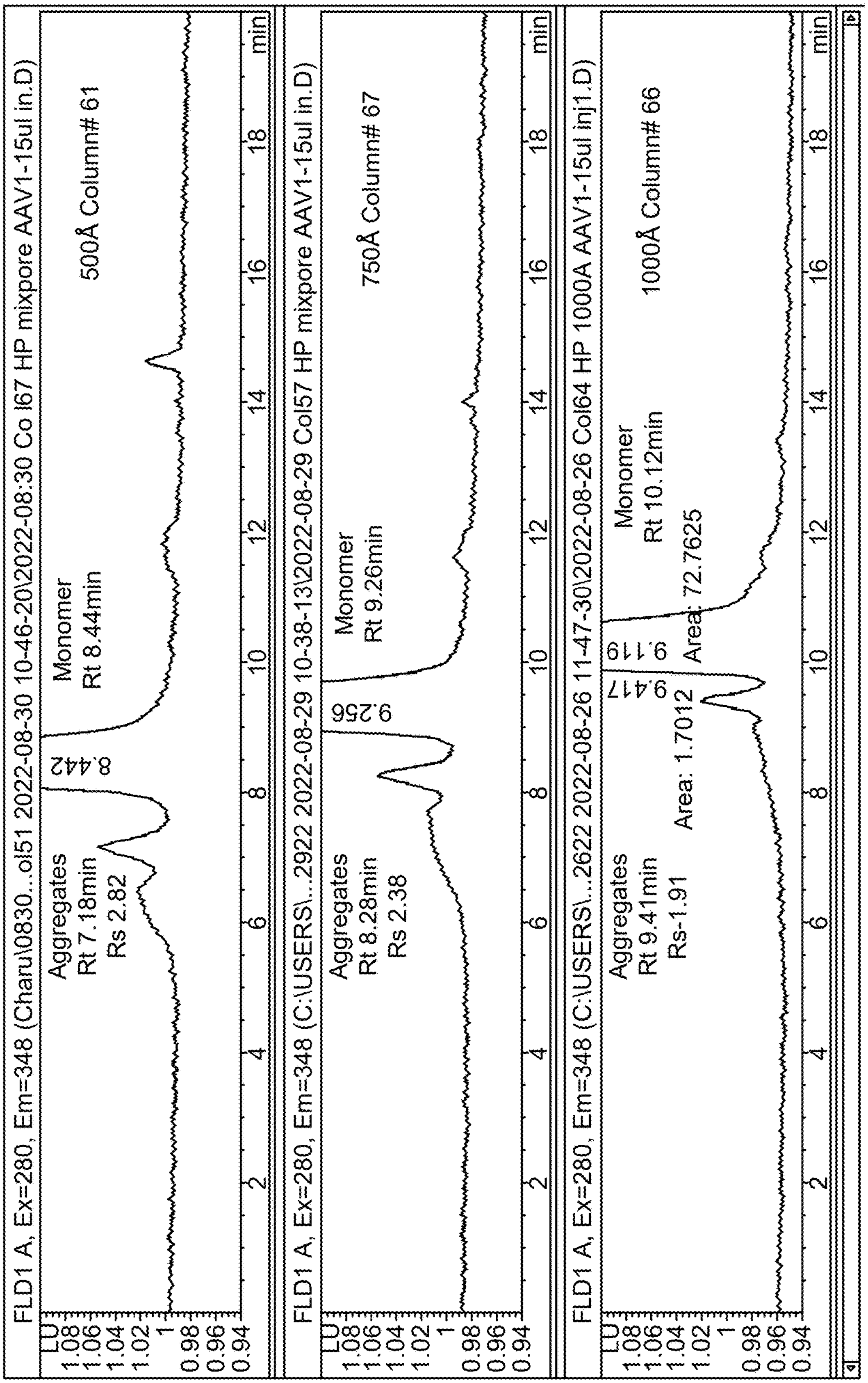
FIG. 1B is a chromatogram illustrating the effects of inventive pore size on separation of monomers and dimers from viral analytes.
Figure 1C:
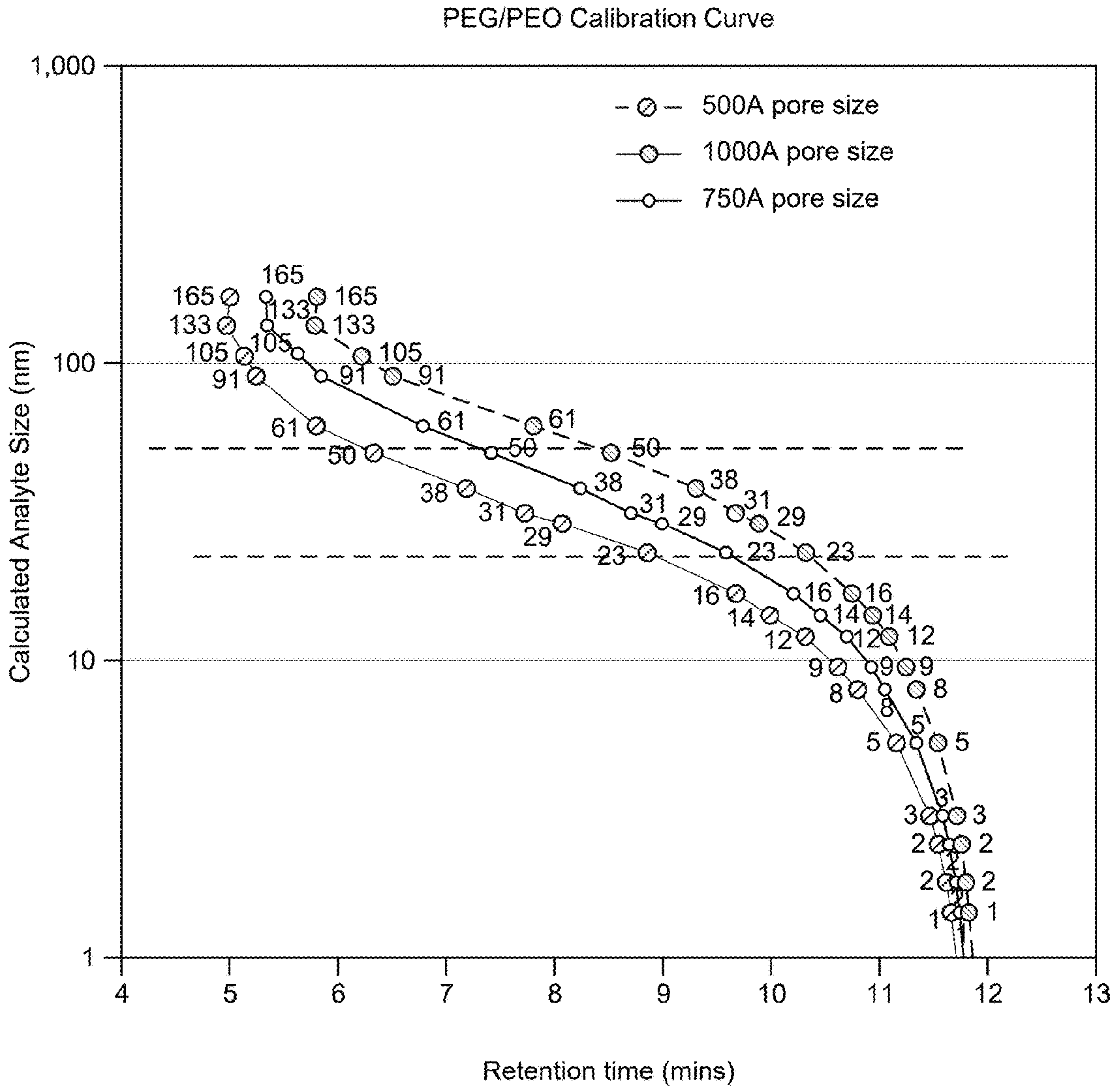
FIG. 1C is a calibration curve using the viral analytes and particles with pore sizes from FIG. 1B.

Example 1B—AAV monomers and dimers were also able to diffuse in and out of columns with pore sizes larger than 500 Å, including 750 Å, and 1000 Å, as shown in FIG. 1B. The viral analyte sizes were varied from 11 nm to 165 nm, but the viral analytes having an inner diameter from about 23 nm to about 50 nm were separated, as shown in FIG. 1B, with retention times ranging from about 3 mins. to about 6 mins., as shown in FIG. 1C.

Figure 1D:
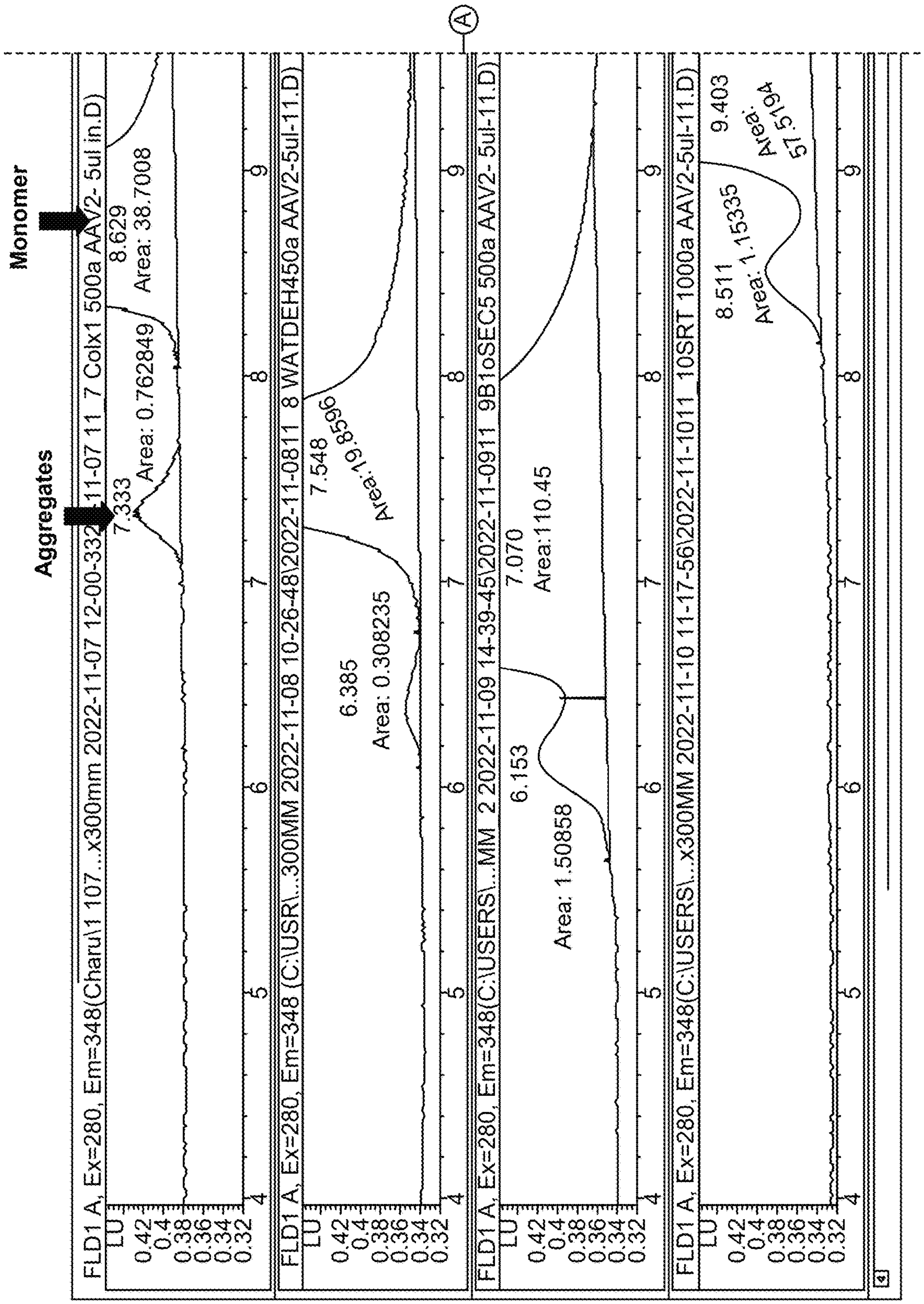
FIG. 1D are chromatograms of columns with different pore sizes showing separation of monomers and dimers from viral analytes.
Figure 1D:
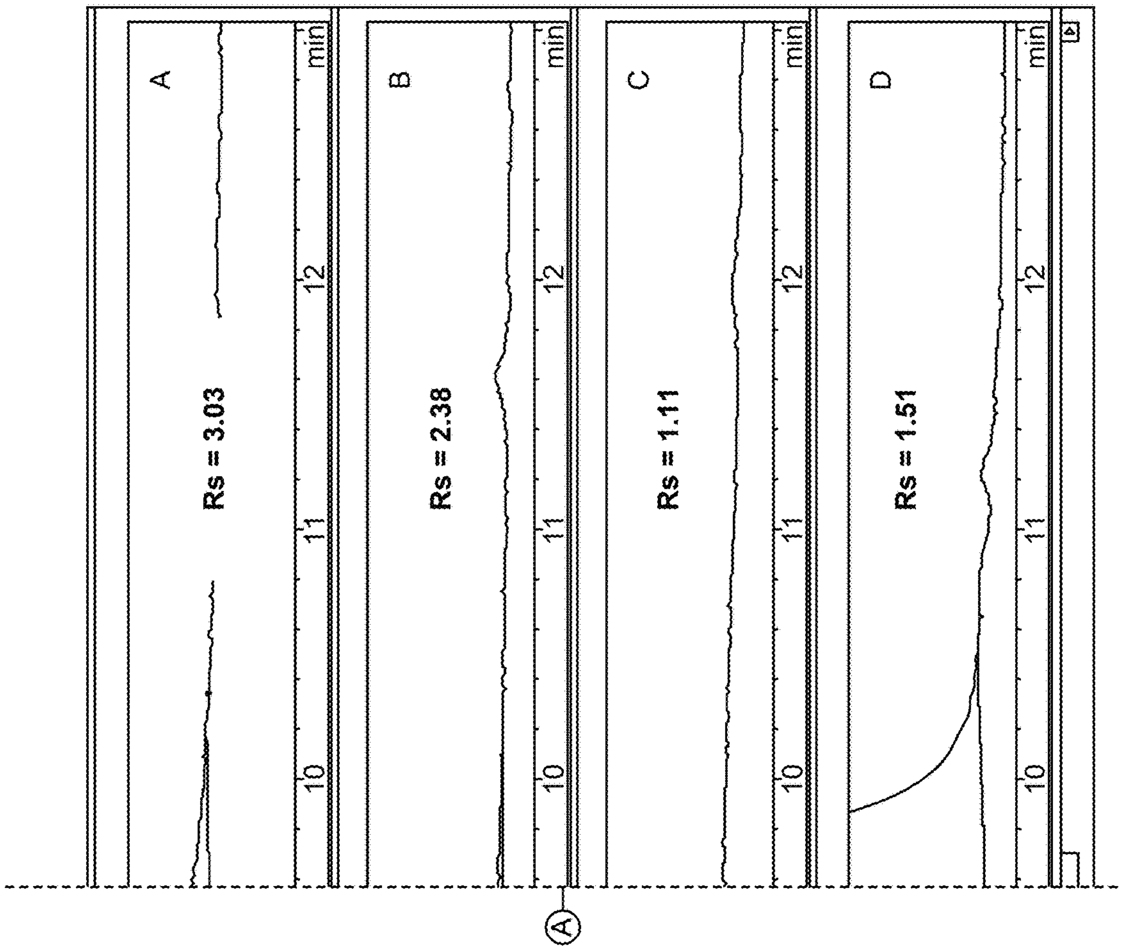

Example 1C—Viral analytes were run through an inventive column (Row A) and comparative columns (Rows B, C, and D). Row A utilized column with particles having an average pore size of about 500 Å. Row B is a column with particles having a particle size of 2.5 μm, and a pore size of 450 Å. Row C is a column with particles having a particle size of 5 μm, and a pore size of 500 Å. Row D is a column with particles having a particle size of 5 μm, and a pore size of 1000 Å. The resolution between monomer and dimer viral analytes is shown in FIG. 1D.

Figure 1E:
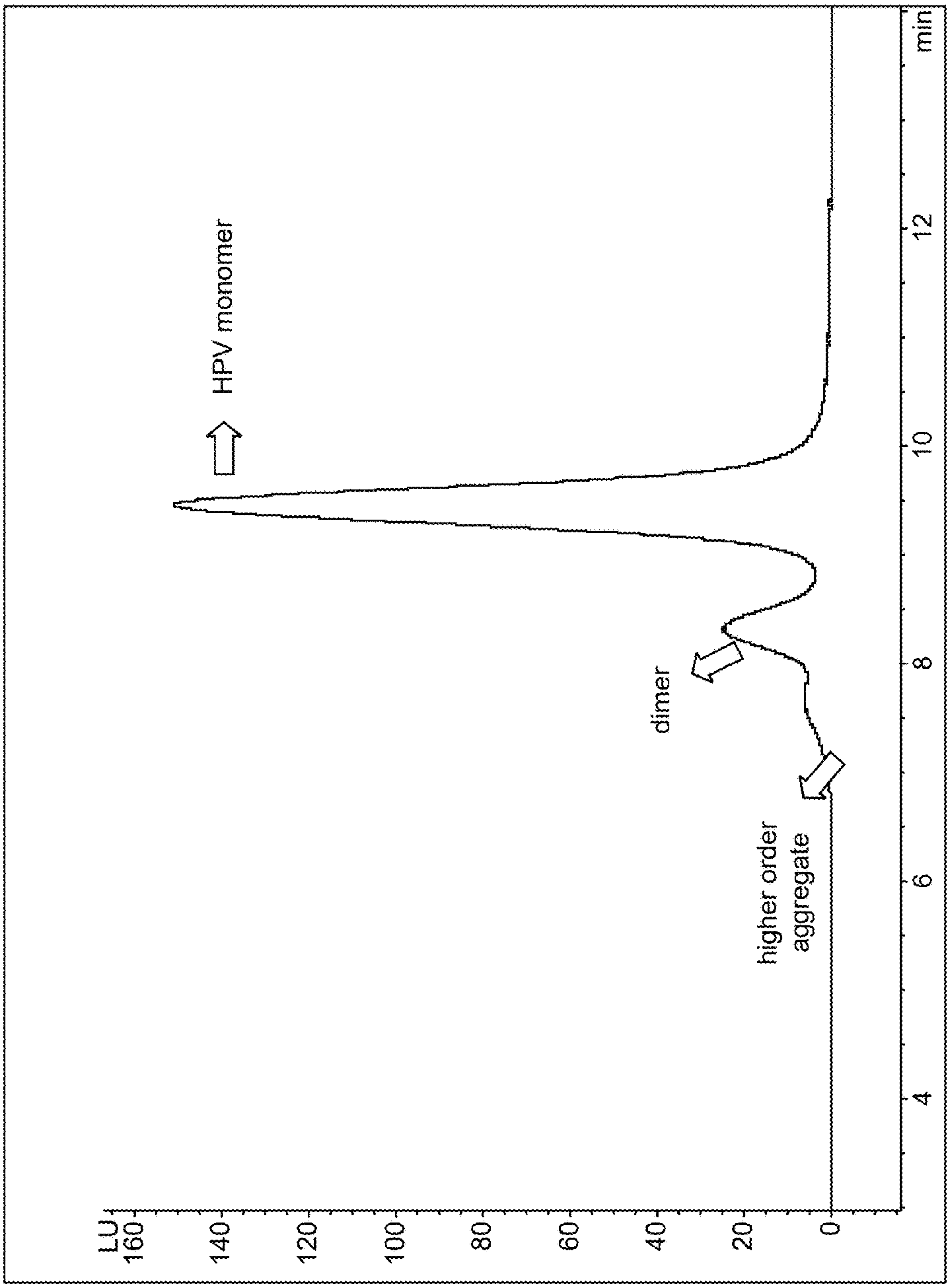
FIG. 1E is a chromatogram of a column with particles having an average pore size of about 1000 Å showing separation of monomers and dimers from a 60 nm viral analyte.
Figure 1F:
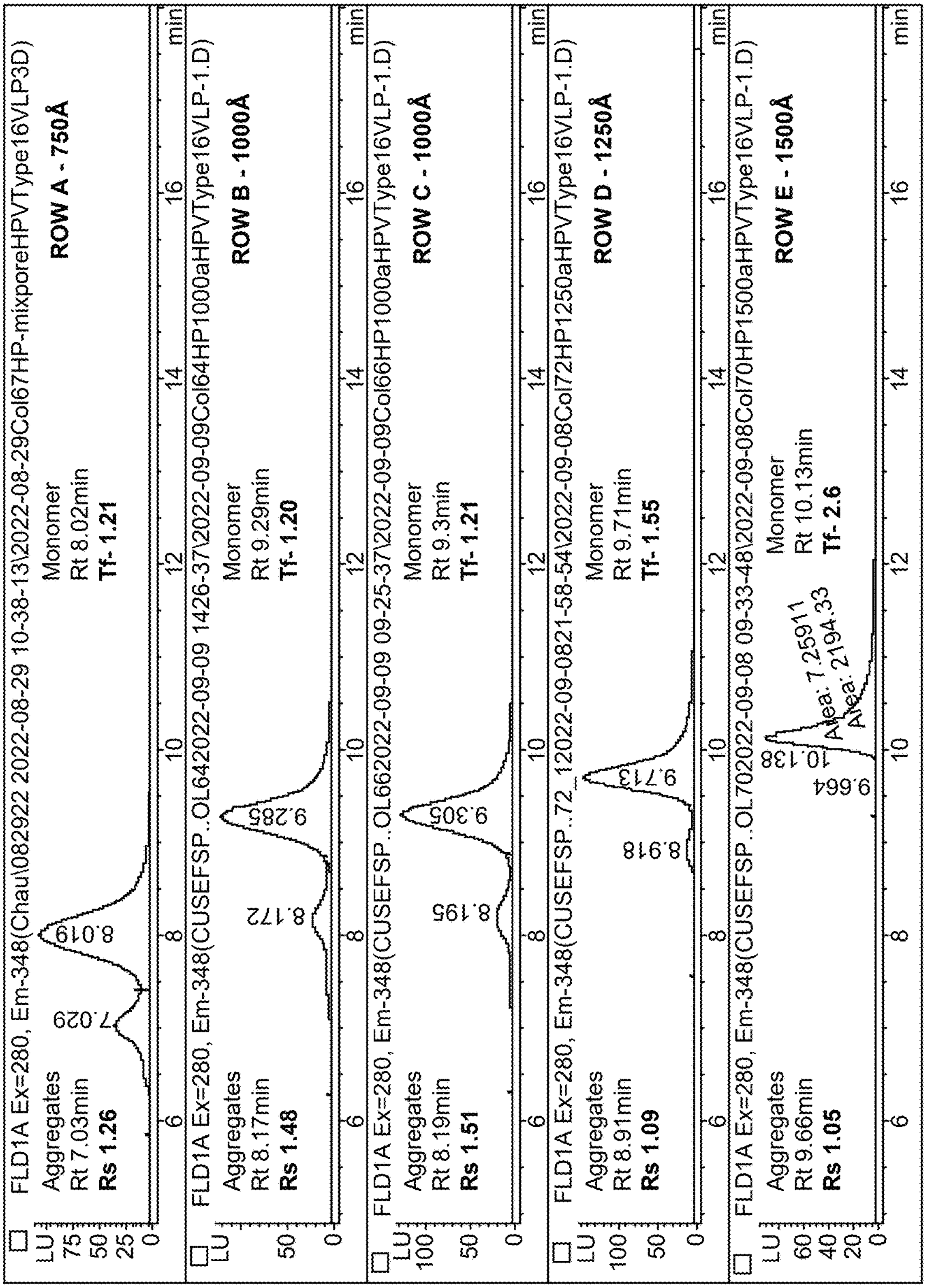
FIG. 1F are chromatograms of columns with particles having various average pore sizes showing separation of monomers and dimers from the 60 nm viral analyte.

Example 1D—An inventive column with particles having a pore size of 1000 Å was used to separate a viral analyte having a diameter of about 60 nm. As shown in FIG. 1E, the monomers, dimers, and higher order aggregates were well resolved. The same viral analyte was separated through columns with particles having various average pore sizes as shown in FIG. 1F. Row A was a column with particles having an average pore size of about 750 Å, Row B was a column with particles having an average pore size of about 1000 Å, Row C was a column with particles having an average pore size of about 1000 Å, Row D was a column with particles having an average pore size of about 1250 Å, and Row E was a column with particles having an average pore size of about 1500 Å. Rows B and C established that the same column can be used to produce nearly exact results thereby establish reproducibility. The monomer and dimer of Row E almost co-eluted probably because the average pore size was too big relative to the size of the diameter of the viral analyte.

Example 2—Pore Volume Effect

Figure 2:
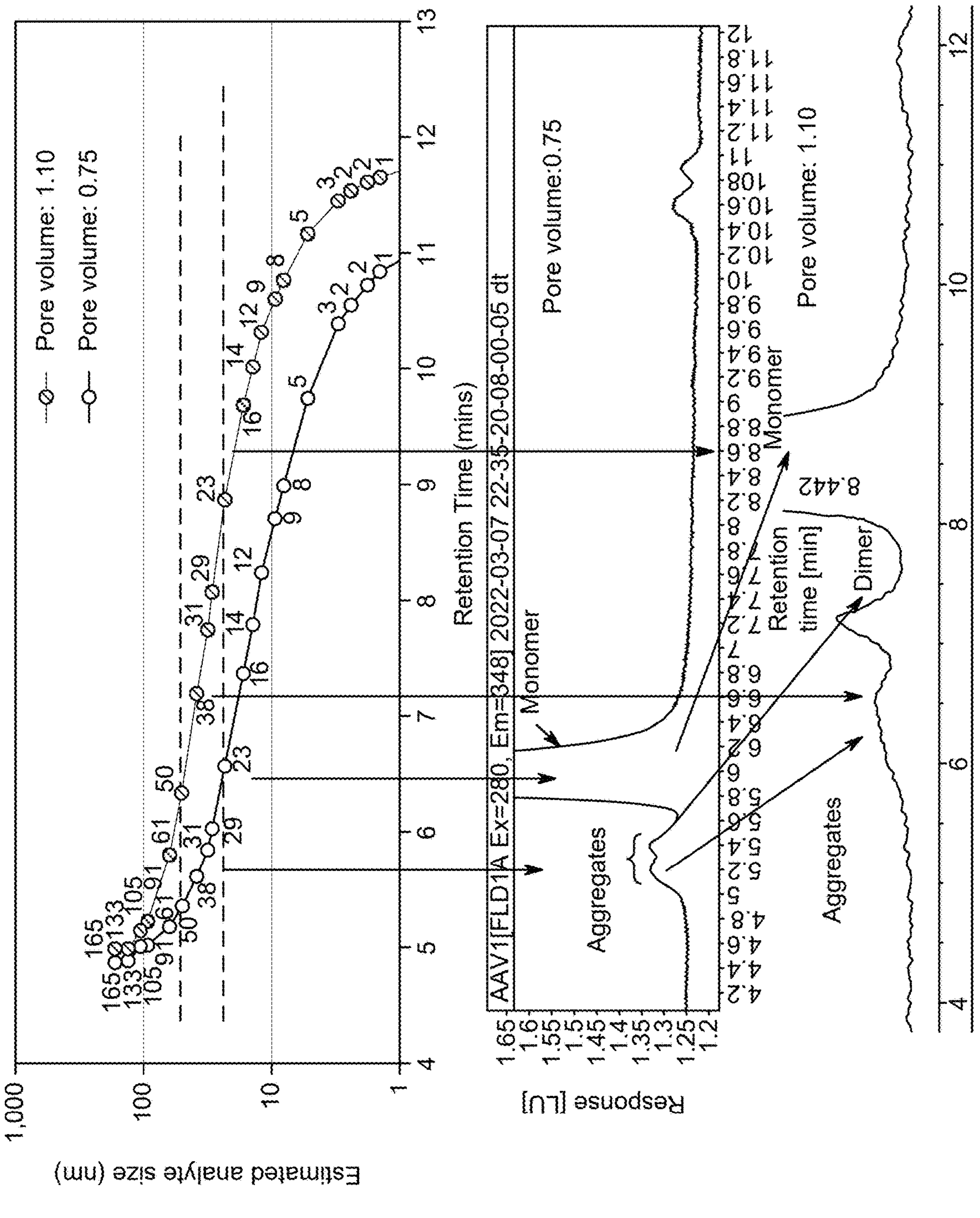
FIG. 2 is a calibration curve and associated chromatogram illustrating the effects of particle pore volume on separation of monomers and dimers from viral analytes.

FIG. 2 shows that increasing the pore volume from 0.75 to 1.10 led to the widening of the separation window. This enabled a better baseline separation and resolution between AAV dimers and higher-order aggregates. In particular, aggregated analytes having an estimated diameter size of about 30-60 nm, diffused through a column having particles having an average pore volume of 0.75 and tended to coelute (as shown in the middle graph of FIG. 2). Analytes with the same diameter size diffused through a column having particles having an average pore volume of 1.10 exhibited clear separation between the higher order aggregates, dimers and the monomers in the analytes (as shown in the bottom graph of FIG. 2). The higher pore volume (1.10) led to a flatter linear curve resulting in a broader separation window and thus better separation of aggregates, dimers, and monomers of the viral analyte.

Example 3—Flow Rate/High Throughput Testing

A viral analyte was injected into a column comprising particles having an average pore size of about 500 Å. The flow rate of the column was varied (0.1 ml/min, 0.2 ml/min, 0.35 ml/min, 0.5 ml/min, and 0.7 ml/min). The relation of total peak area with respect to flow rate was determined where 1/F and total peak area shows good linearity. It suggested that when the viral analyte passed through the column, the viral analyte did not disintegrate or the high flow rate did not cause aggregation or breaking down of aggregates of the viral analyte.

Figure 3:
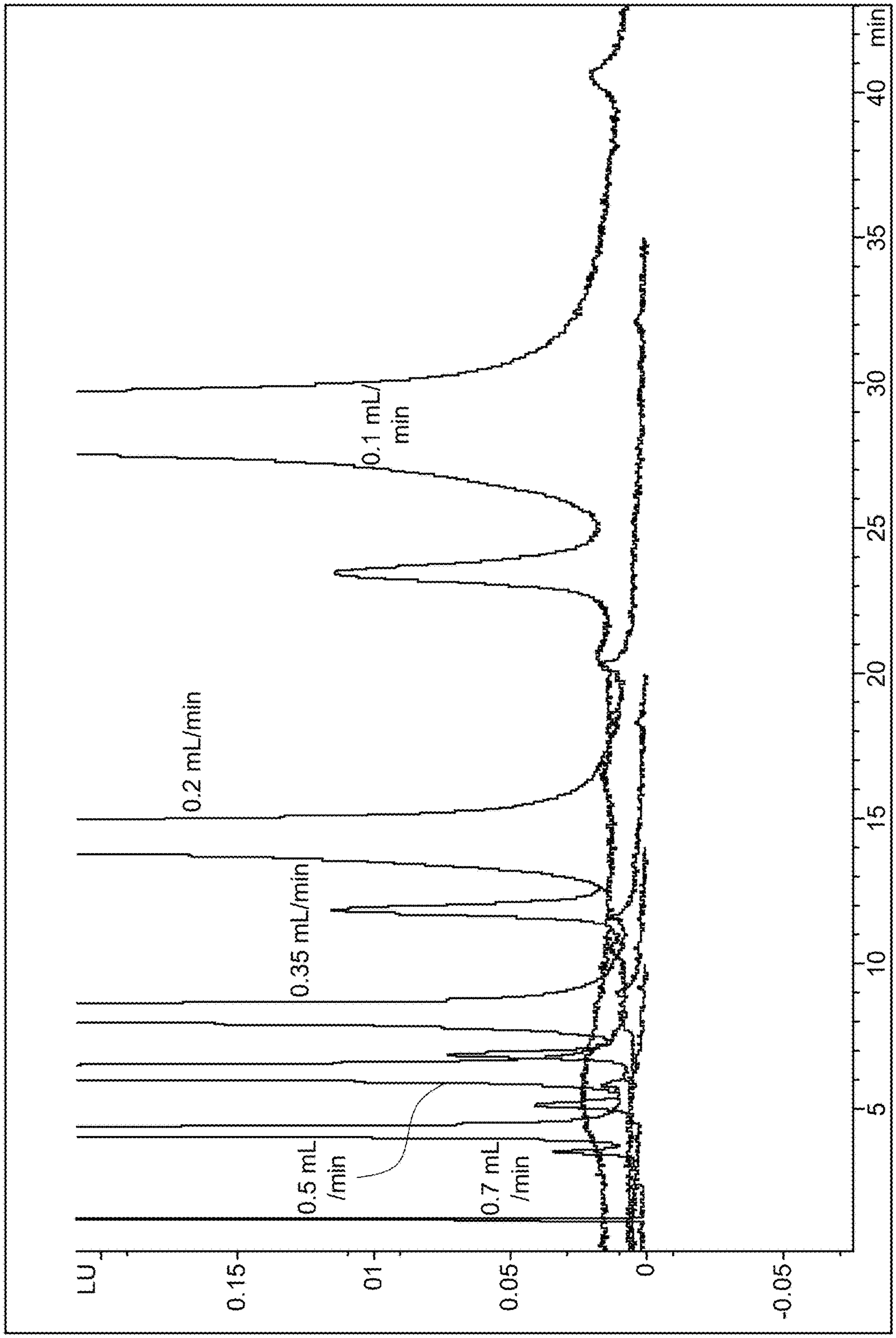
FIG. 3 is a chromatogram illustrating the separation of a 25 nm viral analyte using a column including particles having an average particle size of 500 Å and varying flow rates.

FIG. 3 is a chromatogram showing the elution of a viral analyte with a diameter of 25 nm in a column with particles having an average pore size of about 500 Å. The data shown in Table 1 established that the biological analytes remained stable even at higher flow rates. A resolution of 2.40 between AAV monomers and dimers was achieved within 5 minutes.

TABLE 1

| Flow rate (ml/min) | 1/F | AAV Peak Area | Resolution | Tailing Factor |
|---|---|---|---|---|
| 0.10 | 10 | 300 | 4.37 | 1.05 |
| 0.20 | 5 | 162 | 3.76 | 1.01 |
| 0.35 | 2.9 | 77 | 3.13 | 1.04 |
| 0.50 | 2 | 59 | 2.72 | 1.08 |
| 0.70 | 1.4 | 39 | 2.40 | 1.09 |

Figure 4:
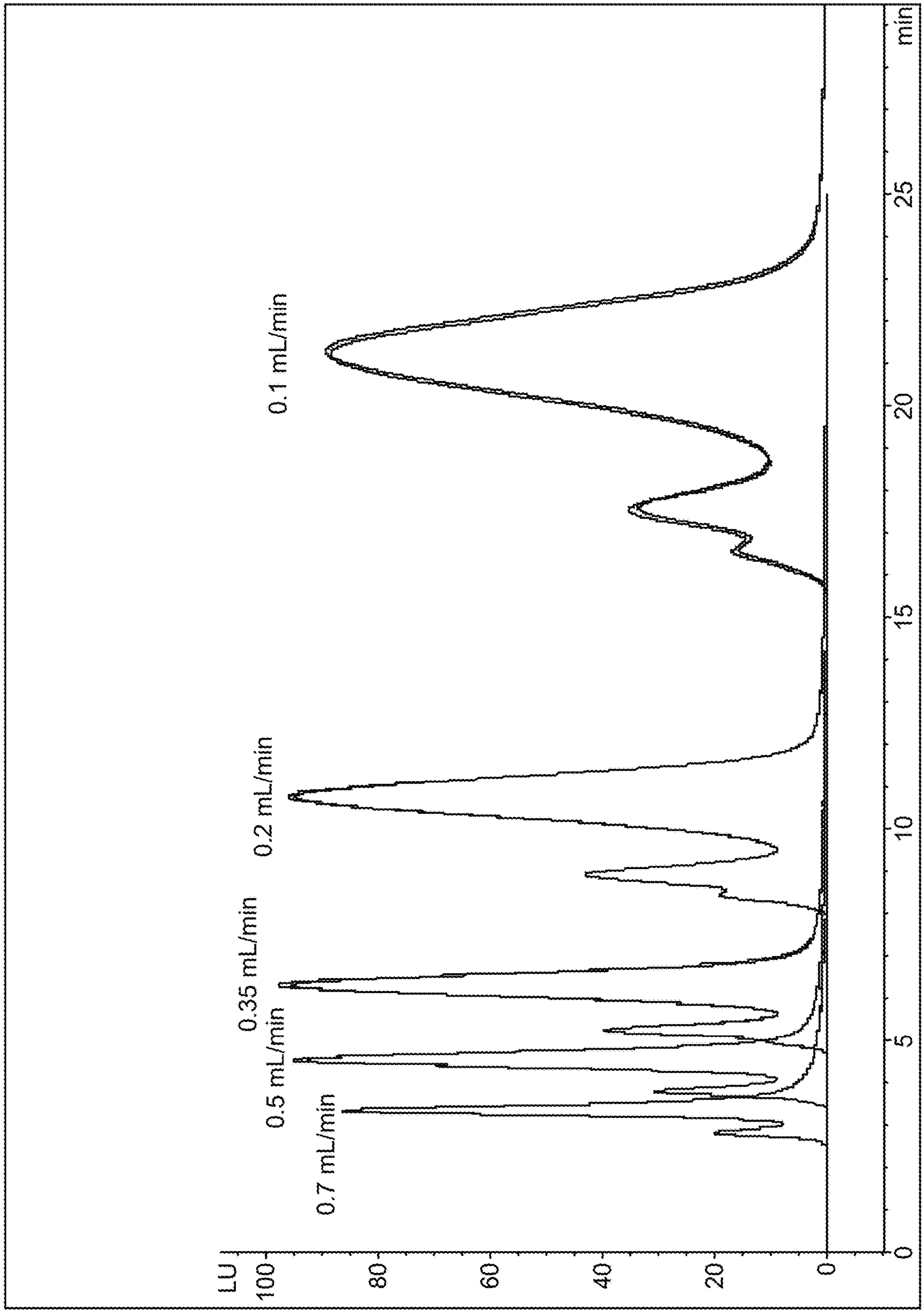
FIG. 4 is a chromatogram illustrating the separation of a 60 nm viral analyte using a column including particles having an average particle size of 500 Å and varying flow rates.

FIG. 4 is a chromatogram showing the elution of a viral analyte with a diameter of 60 nm in a column with particles having an average pore size of about 500 Å. The data shown in Table 2 established that the monomer and dimer/aggregates remained stable even at higher flow rates.

TABLE 2

| Flow rate (ml/min) | 1/F | Peak Area | Resolution | Tailing Factor |
|---|---|---|---|---|
| 0.10 | 10 | 15710 | 1.29 | 0.94 |
| 0.20 | 5 | 8785 | 1.31 | 0.98 |
| 0.35 | 2.9 | 4991 | 1.32 | 1.08 |
| 0.50 | 2 | 3328 | 1.30 | 1.29 |
| 0.70 | 1.4 | 2148 | 1.22 | 1.68 |

Figure 5:
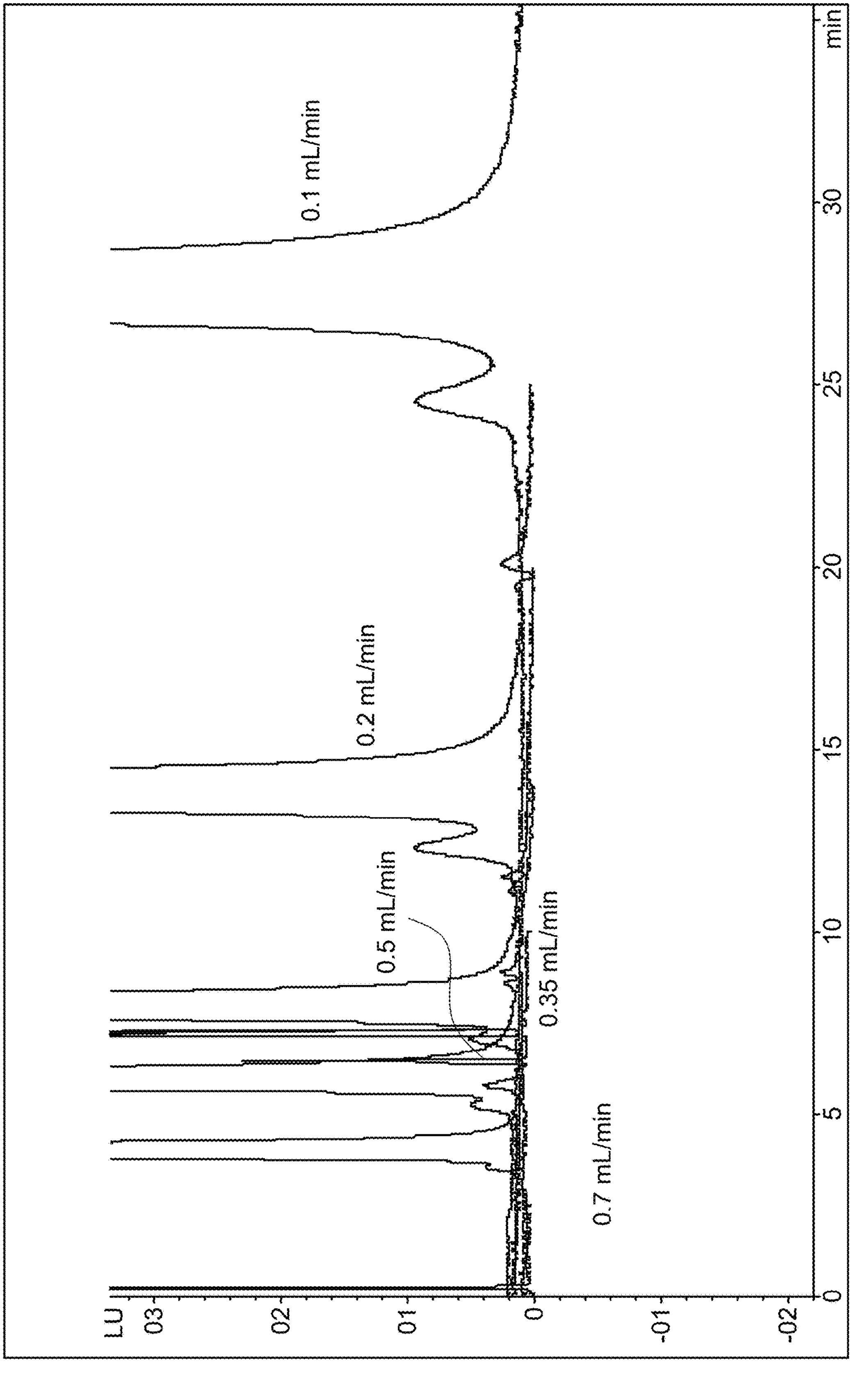
FIG. 5 is a chromatogram illustrating the separation of a 25 nm viral analyte using a column including particles having an average particle size of 750 Å and varying flow rates.

COMPARATIVE—The 25 nm viral analyte was injected into a column made by the prior art comprising particles having an average pore size of about 750 Å (comparative. The flow rate of the column was varied (0.1 ml/min, 0.2 ml/min, 0.35 ml/min, 0.5 ml/min, and 0.7 ml/min). The chromatogram is shown in FIG. 5.

According to Table 3 the prior art column did not achieve a resolution higher than 2.0 at any flow rates studied. The particle structure in the column was not able to separate aggregates from monomers at a flow rate of 0.5 ml/min and above.

TABLE 3

| Flow rate (ml/min) | 1/F | AAV Peak Area | Resolution | Tailing Factor |
|---|---|---|---|---|
| 0.10 | 10 | 254 | 1.95 | 1.18 |
| 0.20 | 5 | 140 | 1.48 | 1.23 |
| 0.35 | 2.9 | 76 | 1.18 | 1.28 |
| 0.50 | 2 | 62 | 1.09 | 1.31 |
| 0.70 | 1.4 | 43 | 1.07 | 1.35 |

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a column and its many aspects, features and elements. Such a column can be dynamic in its use and operation, this disclosure is intended to encompass the equivalents, means, systems and methods of the use of the column and/or particles and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A chromatography column, comprising:

particles having an average particle size ranging from about 1 μm to about 5 μm;

an average pore size ranging from about 450 Å to about 3000 Å;

an average pore volume ranging from about 1 $cm^3/g$ to about 5 $cm^3/g$; and a particle size distribution of less than about 20% of the average particle size.

2. The column of claim 1, wherein the particles have an average pore size ranging from about 475 Å to about 2000 Å; and an average pore volume ranging from about 1 $cm^3/g$ to about 3 $cm^3/g$.

3. The column of claim 1, wherein the particles have an average pore size ranging from about 500 Å to about 1250 Å; and an average pore volume ranging from about 1 $cm^3/g$ to about 1.5 $cm^3/g$.

4. The column of claim 1, wherein the particles have an average pore size of about 500 Å; and an average pore volume of about 1.1 $cm^3/g$.

5. The column of claim 1, wherein the particles have an average pore size of about 1000 Å; and an average pore volume of about 1.1 $cm^3/g$.

6. The column of claim 1, wherein the particles are metal oxide particles.

7. The column of claim 1, wherein the particles are silica.

8. The column of claim 1, wherein the particles have an average particle size ranging from 2.5 μm to 3.5 μm.

9. A method of using a size exclusion chromatography column, comprising:

injecting a viral analyte into a column comprising particles having an average particle size ranging from about 1 μm to about 5 μm; an average pore size ranging from about 450 Å to about 3000 Å; and an average pore volume ranging from about 1 $cm^3/g$ to about 5 $cm^3/g$; and operating the column at an adjustable flow rate of between about 0.1 ml/min and about 0.7 ml/min to achieve chromatographic separation of the viral analyte at a resolution of at least 1.2.

10. The method of claim 9, wherein viral analyte has an average diameter ranging from about 10 nm to about 55 nm.

11. The method of claim 9, wherein viral analyte has an average diameter ranging from about 60 nm to about 100 nm.

12. The method of claim 9, wherein the flow rate is greater than about 0.1 ml/min.

13. The method of claim 9, wherein the flow rate is greater than 0.35 ml/min.

14. The method of claim 9, wherein monomers from the viral analyte separate from higher aggregates of the viral analyte.

15. The method of claim 9, wherein the viral analyte does not disintegrate at a flow rate greater than about 0.35 ml/min.

16. The method of claim 9, wherein the particles have an average pore size ranging from about 475 Å to about 2000 Å; and an average pore volume ranging from about 1 $cm^3/g$ to about 3 $cm^3/g$.

17. The method of claim 9, wherein the particles have an average pore size ranging from about 500 Å to about 1250 Å; and an average pore volume ranging from about 1 $cm^3/g$ to about 1.5 $cm^3/g$.

18. The method of claim 9, wherein the particles have an average pore size of about 500 Å; and an average pore volume of about 1.1 $cm^3/g$.

19. The method of claim 9, wherein the particles have an average pore size of about 1000 Å; and an average pore volume of about 1.1 $cm^3/g$.

20. The method of claim 10, wherein the chromatographic separation achieves a resolution of at least about 2.4.

* * * * *